United States Patent
Kingdon et al.

(10) Patent No.: US 6,185,428 B1
(45) Date of Patent: Feb. 6, 2001

(54) SYSTEM AND METHOD FOR ADAPTIVELY MODIFYING BASE STATION TRANSCEIVER RESOURCES FOR TIME OF ARRIVAL MEASUREMENTS

(75) Inventors: Christopher H. Kingdon, Garland, TX (US); Andres Thomas Holmring, Stockholm (SE); Bagher Rouhollah Zadeh, Dallas, TX (US)

(73) Assignee: Ericsson Inc, Research Triangle Park, NC (US)

( * ) Notice: Under 35 U.S.C. 154(b), the term of this patent shall be extended for 0 days.

(21) Appl. No.: 09/167,901

(22) Filed: Oct. 7, 1998

(51) Int. Cl.⁷ .............................. G01S 3/02; H04B 7/005
(52) U.S. Cl. ......................... 455/456; 455/450; 455/561
(58) Field of Search .................................. 455/456, 457, 455/450, 452, 453, 561

(56) References Cited

U.S. PATENT DOCUMENTS

| | | | |
|---|---|---|---|
| 5,327,144 | * | 7/1994 | Stilp et al. ............................ 342/387 |
| 5,901,358 | * | 5/1999 | Petty et al. ............................ 455/456 |
| 5,926,765 | * | 7/1999 | Sasaki ................................... 455/456 |
| 5,952,969 | * | 9/1999 | Hagerman et al. .................. 342/457 |
| 6,031,490 | * | 2/2000 | Forssen et al. ....................... 342/457 |

FOREIGN PATENT DOCUMENTS

O 369 535 A2  11/1989 (EP) .
WO98/15150   9/1998 (WO) .

* cited by examiner

Primary Examiner—Daniel S. Hunter
Assistant Examiner—Thuan T. Nguyen
(74) Attorney, Agent, or Firm—Jenkens & Gilchrist

(57) ABSTRACT

A system and method that makes more efficient utilization of BTS resources when BTSs are employed in time of arrival (TOA) measurements as is common in mobile positioning operations. A maximum signaling delay is assumed for which BTS resource assignment is delayed by a default time span in the event of an impending TOA measurement thereby allowing the BTS availment of the resources which would otherwise be idle yet assigned and therefore unavailable for other BTS functions during the period of signaling delay. The period of resource assignment delay may be increased or decreased, the actual adaption of the delay dependent on the true signaling delay.

14 Claims, 3 Drawing Sheets

SYSTEM AND METHOD FOR ADAPTIVELY MODIFYING BASE STATION TRANSCEIVER RESOURCES FOR TIME OF ARRIVAL MEASUREMENTS

BACKGROUND OF THE PRESENT INVENTION

1. Field of the Invention

The present invention relates, in general, to the mobile communications field and, particularly, to a system and method for adaptive start times for time of arrival measurements utilized in mobile positioning operations.

2. Background and Objects of the Present Invention

Mobile radio position determination is an emerging field that has gained a great deal of interest lately, and it is now desirable to include a position determination capability in future cellular mobile radio systems. The Time Difference of Arrival (TDOA) position determination method, which is known from military applications, has been used successfully for determining the position of mobile radio terminals. A typical TDOA position determination system can be either terminal based, whereby Time Of Arrival (TOA) measurements are made on the "downlink" in the mobile station (MS), or network based, whereby the network performs the TOA measurements on the "uplink" in the radio base transceiver stations (BTSs). These TOA measurements are then used to calculate TDOA parameters and estimate the MS's position.

One position determination system, which has been used for cellular mobile radio position determination, is marketed by TruePosition™. This system has been used for determining the position of standard analog mobile radio terminals which operate in accordance with the IS-54 standard. Currently, these terminals constitute the vast majority of mobile radio terminals being used in the United States. The TruePosition system, with its own listening radio base transceiver stations, is operated independently of cellular systems and can serve wireline ("A" frequency band) and non-wireline ("B" frequency band) operators within the same geographical area. As such, these operators can share the same TruePosition position determination system. Upon request, the TruePosition system provides position information of individual cellular mobile radio terminals within a given locale. Otherwise, the position determination system normally does not communicate with the cellular mobile radio systems.

As mentioned earlier, the TDOA method of position determination used by the TruePosition system is based on a known military application. Essentially, with the TDOA method, the absolute TOAs of an uplink message transmitted by a mobile radio terminal are registered in at least three fixed radio BSs. This information is processed in a centrally located processor, which calculates the position of the terminal. The registration of uplink messages in the TruePosition system is directed primarily to uplink control messages on the (analog) access channels (i.e., "reverse control channels" under the IS-54 standard). Notably, under the IS-54 standard, some of these control messages (e.g., registering messages and page response messages) contain the terminal identity in unencrypted code, which enables the TruePosition system to determine the position of a specific terminal without having to obtain any information from the cellular network operator responsible for the terminal concerned. The IS-54 standard further eases the positioning task by having all of the access channels assigned to a few, fairly narrow frequency bands, rather than having them dispersed over a wide frequency band among the traffic channels (e.g., as is the case for the IS-136 standard).

However, the primary use of access channels means that position determination is more easily performed for mobile radio terminals in an idle mode, because the access channels are used only by idle terminals (e.g., when registering or after being paged). If the position of a mobile terminal is to be determined while it is in a conversation mode, the TruePosition system has the option of utilizing a few traffic channels for voice channel tracking. Consequently, for example, if a police person's position is to be determined during an action while talking over a handheld radiophone, the network is required to hand-off or originally assign the radiophone to a traffic channel being monitored by the TruePosition system.

U.S. Pat. No. 5,327,144, to Stilp et al., discloses a TDOA cellular telephone location system (apparently associated with the TruePosition system). According to this patent, the uplink signals transmitted periodically (e.g., cellular registering messages which can occur every 15 minutes under the IS-54 protocol) by a mobile radio terminal on a reverse (analog) control channel are received and recorded by at least 3 radio base transceiver stations. The TOA of each signal is recorded at the respective radio base transceiver station together with the identity of the transmitting terminal (contained in the uplink message). This information is transferred to a processor, which uses the TDOAs resulting from the three TOAs and the known locations of the radio base transceiver stations to calculate the position of the so-identified mobile radio terminal.

PCT Application No. WO 94/27161, to Stilp et al., (also apparently associated with the TruePosition system) discloses a TDOA system for determining the position of a mobile transmitter. The uplink signals transmitted responsively rather than periodically (e.g., cellular page-acknowledgment messages) by a mobile radio terminal are received, time-stamped with the TOA, and recorded by a plurality of BTSs together with the identity of the transmitting terminal (contained in the uplink message). This information is transferred to a processor, which uses the TOAs and known locations of the radio BSs to calculate the position of the so-identified mobile radio terminal.

A network-based method for determining the position of cellular mobile stations is disclosed in commonly-assigned Swedish Patent Application No. 9303561-3 to R. Bodin. In order to determine the position of a mobile station, a handover procedure is initiated between a serving base transceiver station and the mobile station. The mobile station transmits access request signals to a new base transceiver station. The base transceiver station measures the time delay for the access request signal to travel between the mobile station and the base transceiver station. This procedure is repeated between the mobile station and one or more additional base transceiver stations. A service node in the cellular network calculates the position of the mobile station by utilizing information about the known positions of the base transceiver stations and the measured access time delays.

This network-based method of determining the position of cellular mobile stations relies on so-called asynchronous handovers, where the target base transceiver stations measure the access delays to the mobile station. Each access delay is used as a measure of the distance between the mobile station and the respective base transceiver station. At least two positioning handover operations are needed to obtain three such distances, which can be used in a triangulation algorithm to determine the mobile terminal's position. Notably, one distance can be obtained between the serving base transceiver station and the mobile terminal without a positioning handover. For example, in the Global System for Mobile Communications (GSM), the Timing Advance (TA) value used for time alignment of bursts can optionally be used as a representation of the distance in the serving cell. A more accurate position determination can be attained if more than two such positioning handovers are made, because more than three distances will be known. The use of more than three distance measurements compensates for some errors arising in the individual measurements.

Although the above-described documents illustrate considerable progress in the cellular position determination field, there are still a number of deficiencies to be improved upon. Particularly, in the network-based positioning methods, at least three base transceiver stations, in general, are involved in gathering the requisite TOA data required for an accurate position fix. For example, in the well known method utilizing asynchronous handovers for effecting TOA measurements of the access burst, two BTSs, in addition to the currently serving BTS, are generally required to be readied for impending access burst transmission by the targeted MS. Once the BTS receives the access burst, TOA measurements are made by the respective BTSs and reported to the appropriate positioning entity. However, during the time at which each of the BTSs are informed of a positioning request, and thus an impending handover, the BTSs must each dedicate appropriate facilities, i.e., allocation and activation of a radio channel for the forthcoming access bursts. Once the BTSs are readied for the handover, the BTSs must simply wait until the MS transmits the access bursts. As is well known, the time span between BTS channel allocation and activation to MS access burst transmission can vary greatly depending on a number of factors.

This span may, therefore, be viewed as a temporary loss of system resources, since, during the positioning procedure, a part of resources of each of the BTSs involved are appropriated while waiting for the MS to transmit an access burst. Clearly, as more and more subscribers are added to mobile systems, the already scarce bandwidth will be even more valuable.

It is, therefore, a first object of the present invention to provide an improved system and method for measuring time of arrival of signals in a mobile communications network.

It is another object of the present invention to delay BTS resource allocation in anticipation of signaling delays when making time of arrival measurements.

It is yet another object of the present invention to allow the delay of BTS resource allocation to be adaptive in anticipation of signaling delays when making time of arrival measurements.

It is still another object of the present invention to allow the delay in the BTS resource allocation to be made as a function of prior signaling delays.

It is still another object of the present invention to allow abortion and restart of time of arrival measurements when the delay of BTS resource allocation exceeds the true signaling delay.

SUMMARY OF THE INVENTION

The present invention is directed to a system and method for efficiently utilizing Base Transceiver Stations— resources when the BTSs are employed in time of arrival (TOA) measurements as is common in mobile positioning operations. A maximum signaling delay is assumed for which BTS resource assignment is delayed by a default time span in the event of an impending TOA measurement, thereby allowing the BTS availment of various resources which would otherwise be idle and assigned, and therefore, unavailable for other BTS functions during the period of signaling delay. The period of resource assignment delay may be increased or decreased, the actual adaption of the delay being dependent upon the true signaling delay.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
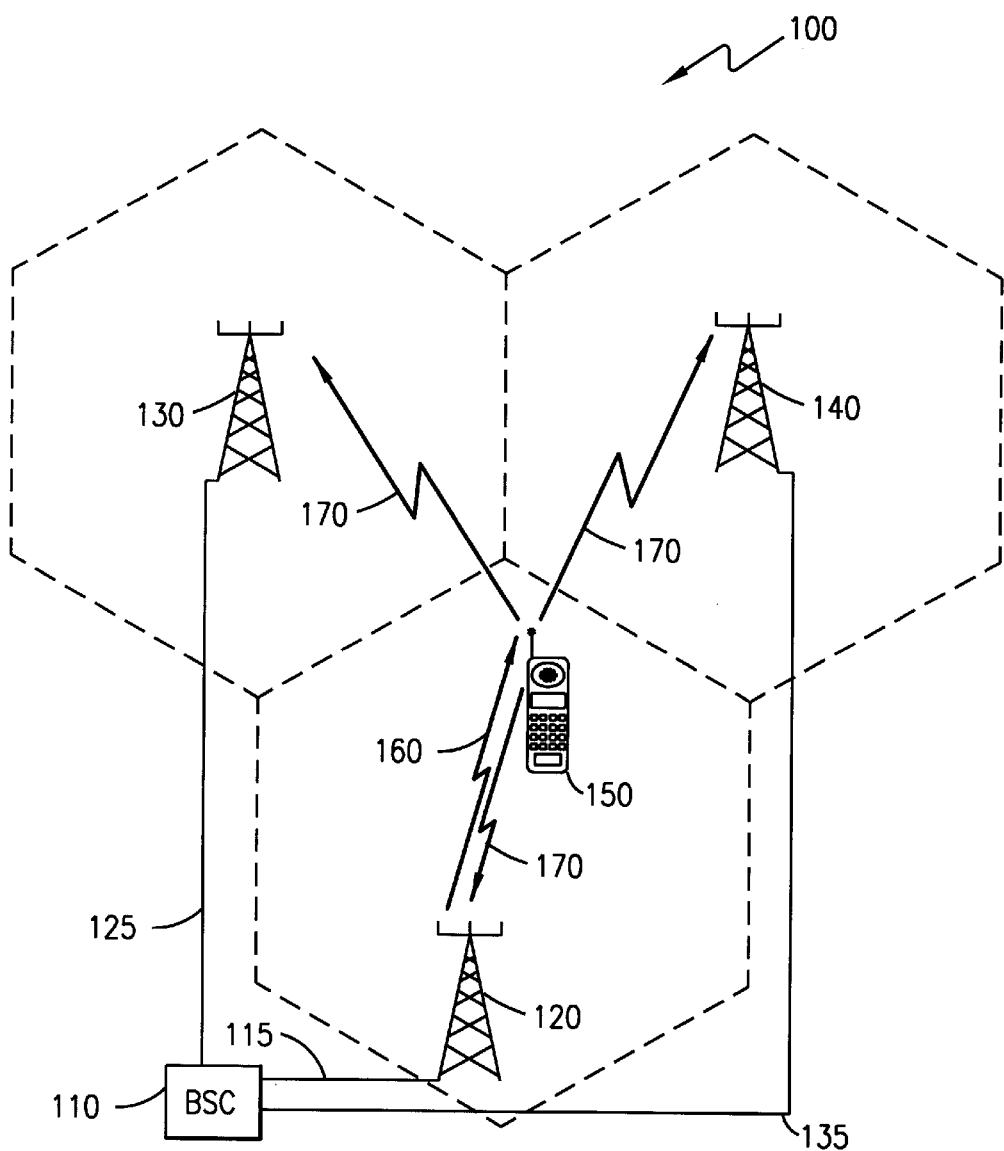
FIG. 1 is an exemplary telecommunications network on which the present invention may be applied.

In FIG. 1 is shown a simplified telecommunication system, generally designed by the reference numeral 100, on which the present invention may be applied. The telecommunication system 100 includes a Base Station Controller (BSC) 110, a number of Base Transceiver Stations (BTSs) 120, 130 and 140 controlled by the BSC 110 and respective communication links 115, 125 and 135 therebetween. A mobile station 150 on which a positioning operation is performed is included. The dashed lines are illustrative of the common, generally hexagonal shape of a cell resulting from the use of BTS antennas with pointing azimuths with 120° of separation, as is well understood in the art. The dashed lines circumscribing each of BTSs 120, 130 and 140 and the position of the MS 150 indicates that MS 150 is currently served by BTS 120.

A positioning operation is initiated by first determining, preferably, at least two secondary BTSs with appropriate radio coverage to carry out the requisite time of arrival measurements, as is well known in the art. For the current illustrative example, the secondary BTSs are BTS 130 and BTS 140. Once these additional BTSs are identified, BSC 110 transmits a position request to the BTSs 120, 130 and 140 through the respective communication links 115, 125 and 135.

The positioning request (POS REQ) contains the information necessary for each of BTSs 120, 130 and 140 participating in the positioning operation to be readied for the impending position fix. This information will contain, but is not limited to, time slot and frequency specifications on which access bursts will be made. BTSs 120, 130 and 140 then reply to the BSC 110 by means of an acknowledge message (POS ACK) transmitted from each of BTSs 120, 130 and 140 to the BSC 110 via the respective communication links 115, 125 and 135.

Once BSC 110 receives the POS ACK message from each of BTSs 120, 130 and 140, a channel activation (CH ACT) message is transmitted to the BTS currently serving the targeted MS 150. In the continuing illustrative example, this serving BTS is BTS 120. Following the reception of the CH ACT message from BSC 110 via communication link 115, BTS 120 responds by sending an acknowledgment message (CH ACK) back to BSC 110 over the aforementioned communication link 115.

A handover command (HO CO) is next sent from the BSC 110 to the BTS 120 through communication link 115 which is immediately transmitted to MS 150 over the air interface on a downlink path 160. The HO CO includes the time slot (TS) and frequency commensurate with the POS REQ message on which the MS should access. MS 150, upon receipt of the HO CO command, then transmits access bursts (HO ACC), generally represented by the reference numeral 170, for a maximum of 320 ms (in GSM) on the frequency and TS specified in the HO CO. Upon completion of the access bursts transmission, the MS 150 then returns to the previous channel. All BTSs 120, 130 and 140 may then report their corresponding TOA measurements to the appropriate entity.

It is important to note that in the prior art systems, BTSs 120, 130 and 140 are required to appropriate significant resources immediately upon reception of the POS REQ message. Specifically, a time slot on a unique frequency is required to be allocated upon the reception of the POS REQ message until completion of the positioning operation.

The present invention greatly improves upon the prior art by allowing the respective BTSs a delay between reception of the POS REQ message and an allocation of the necessary resources for carrying out the positioning operation. By delaying the appropriation of the TS and frequency, this allotted channel is made available for other functions during the specified delay in which, otherwise, the channel would be waiting for an access burst.

Figure 2:
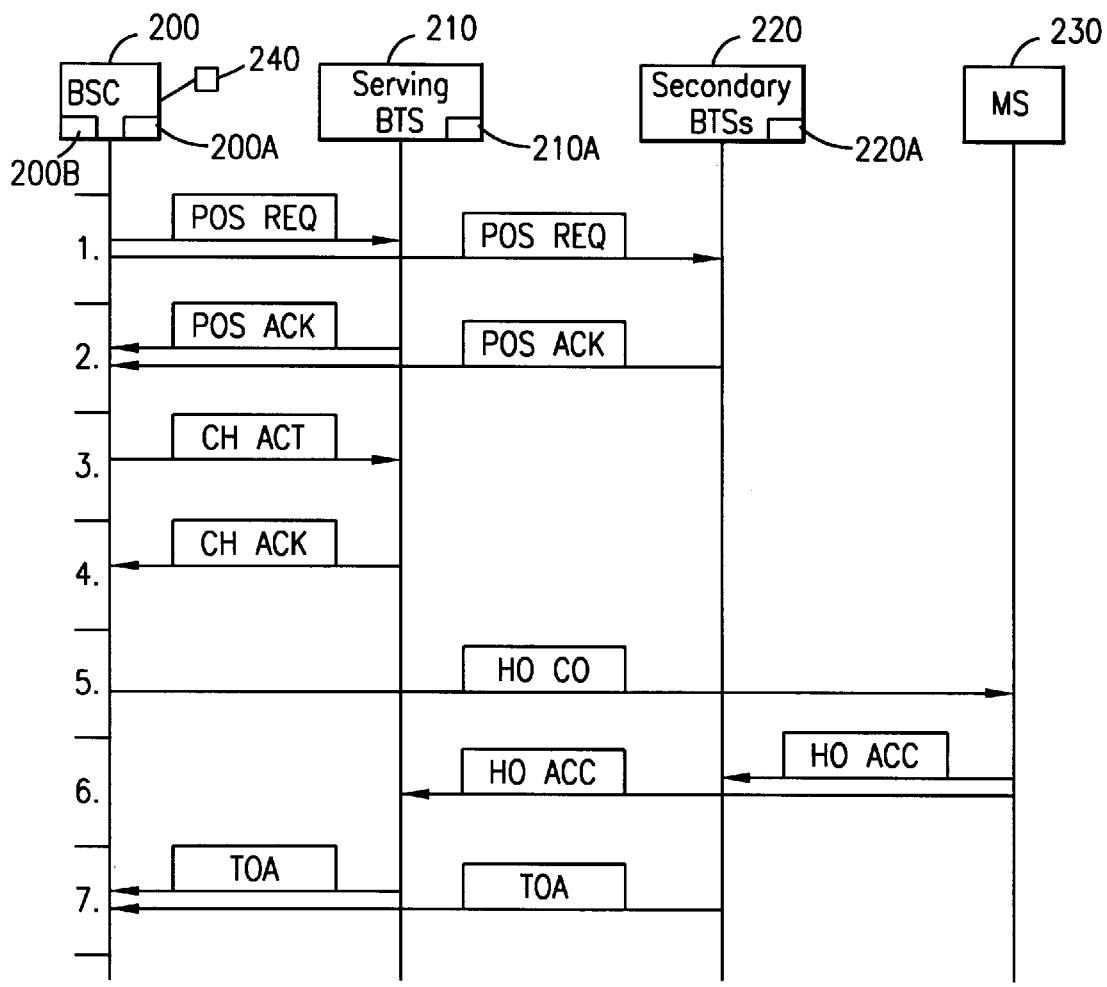
FIG. 2 is an event chronology of a preferred embodiment of the present invention.

In FIG. 2 is shown an event chronology of a positioning operation as may be had in a system suitable for implementation of a preferred embodiment of the present invention. A BSC 200, such as the BSC 110 in FIG. 1, first transmits a POS REQ message to a serving BTS 210 and the secondary BTSs, generally referred to by the box 220 (step 1, as indicated by the reference numeral at the left). In the prior art system, each of the serving BTS 210 and the secondary BTSs 220 must actively start seeking access bursts on the TS and frequency specified in the POS REQ message immediately upon its reception. Each of the serving BTS 210 and secondary BTSs 220 independently acknowledge reception of the POS REQ message by transmission of a POS ACK message (step 2), as further indicated in FIG. 2. The serving BTS 210 is then prepared for an asynchronous handover by transmission of a CH ACT message from the BSC 200 to the serving BTS 210 (step 3). Serving BTS 210 acknowledges reception of the CH ACT message by sending a CH ACK to the BSC 200 (step 4). The BSC 200 then transmits (via the serving BTS 210) the aforedescribed handover command HO CO to the MS 230 (step 5), such as the MS 150 of FIG. 1, which then transmits handover access bursts HO ACC both to the serving BTS 210 and the secondary BTSs 220 (step 6). MS 230 will, upon completion of the HO ACC transmissions, return to either its original channel or remain on the new channel. Each of the serving BTS 210 and the secondary BTSs 220 complete their functions of the positioning operation by independently reporting their respective TOA measurements to the BSC 200 (step 7).

As discussed hereinbefore regarding the prior art systems, the serving BTS 210 and the secondary BTSs 220 must immediately begin seeking for access bursts from the MS 230 upon reception of the POS REQ signal even though a number of prerequisite transmissions, e.g., POS ACK, CH ACT, CH ACK and HO CO, for example, are subsequently required before the MS 230 can begin transmission of the access bursts HO ACC. Regardless of the delay between transmission of the POS REQ signal by the BSC 200 and the HO ACC signal transmission by the MS 230, however, the TS on the specified access burst frequency on each BTS is engaged and in waiting for the access burst signal from the MS 230.

The potential efficiency increase proposed by the system and mixture of the present invention can be more appreciated when consideration is given to the fact that the POS ACK, CH ACT and CH ACK signals can take from 0.1 to 1.0 seconds per transmission while the HO CO takes approximately 0.1 seconds. Therefore, in the worst case scenario, there is a 3.1 second lapse between the reception of a POS REQ signal by the serving BTS 210 and the secondary BTSs 220 and the consequent access burst transmissions by the MS 230.

The present invention improves the overall efficiency of the positioning operation by including in the POS REQ command signal a delay time over which the respective BTSs will wait before allocating the required resources for reception of the access bursts from MS 230. By allowing the BTSs to delay the required appropriation, the various BTS resources may be utilized for other functions.

With reference again to FIG. 2, the positioning operation of the present invention is initiated by transmission of the POS REQ message from the BSC 200 to each of the serving BTS 210 and the secondary BTSs 220 where the POS REQ signal includes a delay time. The delay time is preferably initially set to a pre-stored default valve, contained in a memory 200A located within BSC 200, although the value of the delay time may change, as will be discussed in the forthcoming example. For illustrative purposes, the default delay time will be about 0.4 seconds, indicating the approximate minimal signaling delay time, as discussed hereinabove. Therefore, each BTS will independently wait about 0.4 seconds from their respective receptions of the POS REQ signal before assigning the appropriate TS on the specified frequency to actively seek the access bursts. However, each of the serving BTS 210 and the secondary BTSs 220 immediately, upon their respective reception of the POS REQ, send a POS ACK to BSC 150, as is normally performed. Each of the serving BTS and the secondary BTSs are respectively equipped with timers 210A and 220A. These timers function to measure the delay period upon the expiration of which, each of the BTSs respectively allocate the necessary resources, e.g., a specific time slot on a specified frequency, for carrying out the mobile positioning operation. Each of the timers 210A and 220A start simultaneously upon transmission of the POS ACK from the respective BTS. Until the timer runs for a period equivalent to the delay period as specified in the POS REQ, the BTS containing the respective timer will not allocate compulsory resources for fulfilling the mobile positioning operation. Once the timer has run for the specified delay time, however, the requisite resources are thereupon assigned.

As in the prior art, the BSC 200 must wait for the POS ACK message from the serving BTS 210 regardless of the order of BTS POS ACK messages received at the BSC 200. Upon reception of the POS ACK signal from the serving BTS 210, the CH ACT is transmitted to the serving BTS 210 which responds by transmitting the CH ACK back to the BSC 200. At this point, the HO CO signal is transmitted to the MS 230 from the BSC 200 unless the BSC 200 has yet to receive a POS ACK from any of the secondary BTSs 220. This assures that the HO CO is not needlessly transmitted to the MS 230 before any of the BTSs have been readied for reception of the HO ACC transmission.

Pursuant to making the delay time adaptable or variable, the BSC 200 starts a timer 240 upon the transmission of the POS REQ messages to the BTSs. This timer 240, associated with or incorporated within the BSC 200, measures the time from transmission of the POS REQ to the time of reception of the last received POS ACK or CH ACK (since the secondary BTSs may respond after the serving BTS' channel acknowledgment). This time, referred to hereinafter as the wait time and denoted by the reference character T, is essentially an indication of the current load or excess capacity on the system. A large wait time indicates that the system is heavily loaded, thereby causing a slow response from the BTSs to the position requests.

Upon evaluation of the wait time, e.g., by a processor 200B associated with the BSC 200, a comparison is made between the wait time and the delay time, which is referred to hereinafter by the reference character D. In the event that the wait time exceeds the delay time, i.e., T>D, the delay time may be increased to an amount equal to or less than the difference between the wait time and delay time, thereby allowing the BTSs' resources to be utilized for other processes a greater amount of time before being reserved for reception of the access bursts in subsequent mobile positioning operations. For example, if the wait time is measured to be 1.5 seconds while the delay time is 0.4 seconds, the BTSs involved in the positioning operation are allocating the necessary resources 1.1 seconds prior to transmission of the HO CO command by the BSC 150. Therefore, by increasing the delay time by an amount equal to or less than the difference between the wait time and delay time (T–D), e.g., 1.1 seconds in the current example, reservation of the BTSs' resources will more closely occur at a time necessitating their allocation, i.e., at about the time of transmission of the HO ACC commands by the MS 230 and preferably slightly before. In the event the delay time is adjusted, the new delay time is preferably stored in memory 200A associated with the BSC 200, preferably writing over the previous delay time.

The delay time may also be decreased if the wait time is less than the delay time, i.e., T<D, an event that requires abortion of the HO CO transmission to the MS 230. For example, if the delay time has been adjusted over time to equal 1.5 seconds and a position request results in a shorter wait time of 1.0 seconds, the BSC 200 is ready to transmit the HO CO 0.5 seconds before at least one of the BTSs are out of delay. This indicates that the delay time is too large and should be decreased by an amount greater than or equal to the absolute value of the difference between the wait time and delay time or, equivalently, the difference between the wait time and delay time (T–D) may simply be added to the previous delay time since the (T–D) quantity is negative. Consequently, the HO CO transmission is aborted and the delay time is decreased accordingly. The process then preferably begins again with the transmission of the POS REQ with the new delay time included.

Figure 3:
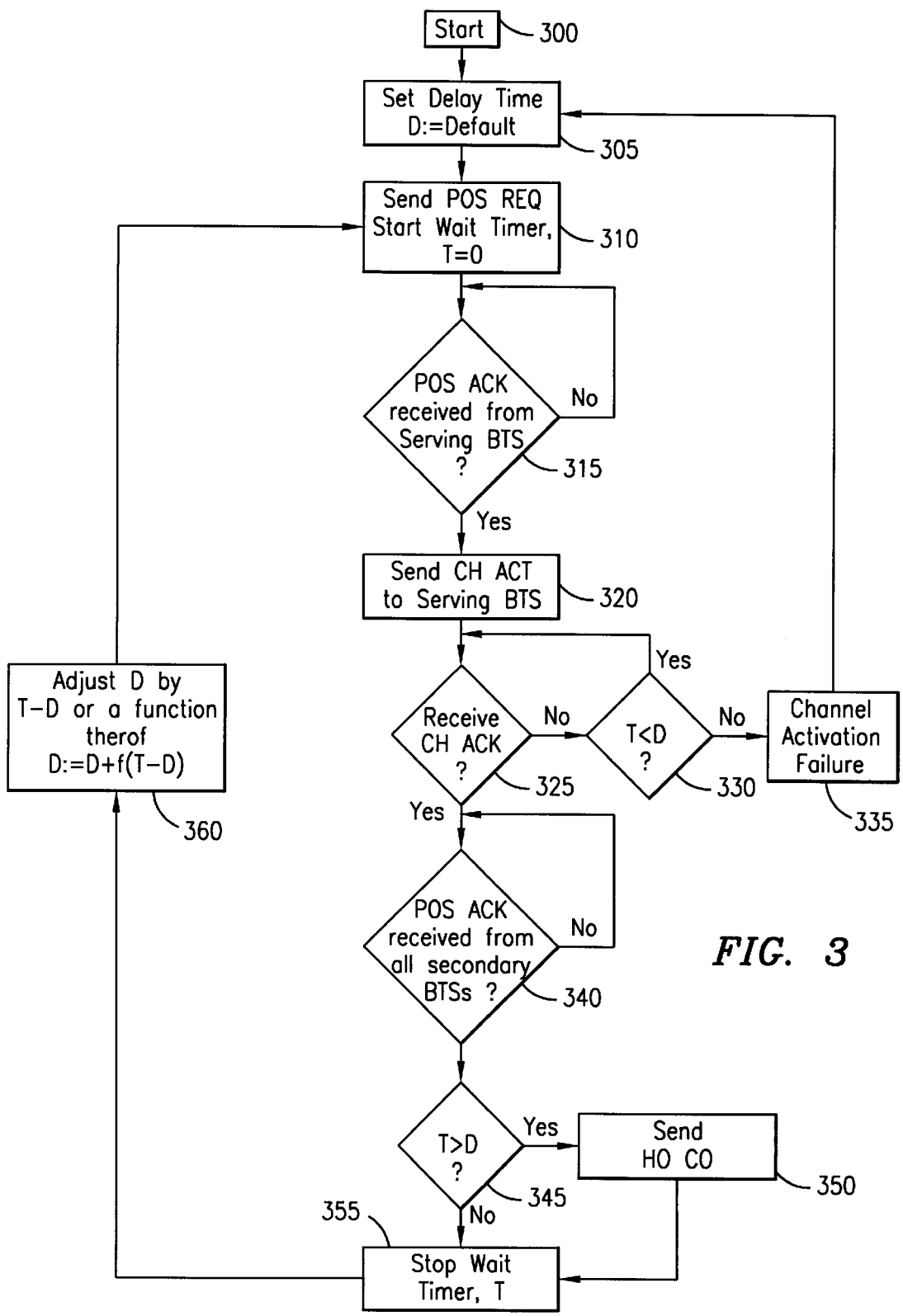
FIG. 3 is a flow chart of a preferred embodiment of the present invention.

A more complete understanding of the present invention may be had with reference to FIG. 3, which depicts a flow chart of a preferred embodiment for practicing the principles set forth in the present invention. The first step is to start the positioning operation, which corresponds to the original position request reception at the BSC 200 in FIG. 2 (box 300). The delay time is also initially set to a pre-stored default, e.g., 0.4 seconds in the aforedescribed example. Control the transfer to box 305 in which the value of D is adjusted.

The POS REQ is next transmitted to each of the BTSs and the wait timer T associated with the BSC 200 is concurrently started (box 310). The routine then begins polling for reception of the POS ACK from the serving BTS 210 (box 315) until the POS ACK is received from the serving BTS 210.

With reference again to box 315, once the BSC 200 receives the requisite POS ACK from the serving BTS 210, the polling routine exits and the CH ACT message is transmitted to the serving BTS 210 (box 330).

Once the BSC 200 transmits the CH ACT to the serving BTS 210, the BSC 200 immediately begins evaluating whether or not the CH ACK has been returned from the serving BTS 210 (box 335). If, however, the CH ACK has not been received at the BSC 200, the current value within the wait timer T is then compared to the delay time D (box 340), e.g., in memory 200A, whereupon a wait time less than the delay time returns operation to polling for reception of the CH ACK signal (box 335). In other words, the resources have not yet been allocated and more time is available to receive the CH ACK. However, if the wait time is greater than (or equal to) the delay time at decision box 340, i.e., the delay period has ended and no CH ACK has been received, a channel activation failure has occurred and central transfers to box 325 and the delay time is increased, as described hereinbefore. It should be understood, however, that in another embodiment of the invention, the method illustrated in FIG. 3 can continue waiting beyond the present delay time (D) for a longer period, during which the BSC 200 waits for the CH ACK from the serving BTS 210, after which the aforementioned channel activation failure is indicated (step 325) and action taken (step 305).

If, however, at box 335, it is determined that the CH ACK has been received, the operation then proceeds to evaluate if the POS ACK messages have been received from all of the secondary BTSs 220 (box 345). If resource allocation has not yet occurred, i.e., T<D (box 350), this polling continues until all secondary BTS POS ACKs have been received, at which point a comparison is then made between the wait time T and the delay time D (box 355). If, however, resource allocation has occurred, i.e., T≧D (box 350), central again transfers to box 325 and the delay time increased for the next iteration.

All of the requisite signaling, i.e., the POS ACK signals from the BTSs and the CH ACK from the serving BTS, has been completed either within the delay time period or beyond it. At this point, a wait time T greater than the delay time D results in the transmission of the HO CO signal to the MS 230 (box 360), i.e., the resources have been allocated and are ready, whereupon the positioning operation is continued to completion, as is understood in the art. This is followed by stoppage of the wait timer (box 365) for subsequent processing, as described below. If, however, at box 355 the wait time, T, is evaluated to be less than (or equal to) the delay time, D, then transmission of the HO CO signal is preferably aborted by transferring control to box 365 since at least one of the secondary BTSs 220 will still be in delay and unready for reception of the HO ACC transmissions. After the wait time T is stopped (box 365), the delay time D is then adjusted as a function of the difference between the wait time T and the delay time D (box 370). In other words, too much time was allocated for the delay time and a downward adjustment must be made.

It should be understood from the above that the start time for the BTS resource allocation is adaptive, i.e., the delay time (D) is adjusted to suit the current load/excess capacity on the connection between the BSC 110 and BTSs 120, 130, and 140, as illustrated in FIG. 1, i.e., connection lines 115, 125 and 135, respectively. For the next positioning request, therefor, the adaptive resource start time can be adjusted downwards to reflect excess delaying of the start time or adjusted upwards should the system load prevent quicker resource allocation.

Indeed, if all of the requisite signals, i.e., the POS ACKs from the serving and secondary BTSs and the CH ACT from the serving BTS, have not been received in time (approximately 0.1 second prior to the expiration of the adaptive start time), the BSC 200 in FIG. 2 will not transmit the HO CO command to the MS 230, and consequently, the MS 230 will transmit the HO ACC bursts. In this case, the serving BTS 210 will time out after approximately the adaption start time (D) plus 0.1 second (the time of delay for HO CO and HO ACC commands) plus about 0.32 second (the maximum transmit time for the HO ACC signal, and return a fault indication at step 7, indicating to the BSC 200 that the adaptive start time has been set too low and should be increased. In other words, if the requisite POS ACK and CH ACK signals were received prior to the fault indication, the "excess time" between the point where the requisite signals were received and the adaptive start time (D) has run out can be measured and D adjusted by adding a time interval equal to or larger than the excess time. A safety margin, i.e., a factor multiplied with the excess time, can therefore be selected and utilized in the adaptive computation.

In the case where one or more of the requisite POS ACKs and CH ACK were not received prior to the fault indication, the adaptive start time (D) must be increased, preferably incrementally up to a worst-case scenario, which in the present invention is approximately 0.5–3.0 seconds.

The inclusion of an adaptive start time for BTS resource allocation when making positioning measurements, as presently set forth in the instant application, allows for more efficient utilization of limited BTS resources. This is clearly critical if the network load is high or, even more so, if speech interrupt of traffic channels served by the secondary BTSs 220 is allowed during the position measurements— a likely scenario if the positioning measurements are for emergency purposes, e.g., 911 location. In this case, interrupts on the speech channels would be clearly audible to the subscribers using the interrupted channels and minimizing the period of interruption is obviously advantageous.

The previous description is of preferred embodiments for implementing the invention, and the scope of the invention should not necessarily be limited by this description. The scope of the present invention is instead defined by the following claims.

What is claimed is:

1. A mobile station positioning method for locating a mobile station within a telecommunications system, said method comprising the steps of:

transmitting, from a said base station controller within said telecommunications system, a mobile positioning request message to a plurality of base transceiver stations, one of said plurality of base transceiver stations being a serving base transceiver station in communication with said mobile station, said mobile positioning request message including a resource allocation delay message;

receiving, by the respective base transceiver stations, said mobile positioning request message; and delaying, within the respective base transceiver stations, allocation of base transceiver station resources a given time period pursuant to said resource allocation delay message.

2. The method according to claim 1, further comprising the step of:

starting, within said base station controller, a digital timer substantially simultaneous to the transmitting of said mobile positioning request message.

3. The method according to claim 1, further comprising the step of:

starting, upon receipt of said mobile positioning request message by said plurality of base transceiver stations, a corresponding plurality of timers therein.

4. The method according to claim 3, further comprising the step of:

transmitting, by each of said respective base transceiver stations, a mobile positioning request acknowledgment message to said base station controller substantially simultaneous to the respective starting of the respective timers within each of said plurality of base transceiver stations.

5. The method according to claim 4, further comprising the step of:

transmitting from said base station controller, a channel activation message to said serving base transceiver station upon reception by said base station controller of said mobile positioning request acknowledgment from said serving base transceiver station.

6. The method according to claim 5, further comprising the step of:

transmitting from said serving base transceiver station, a channel activation acknowledgment to said base station controller upon reception by said serving base transceiver station of said channel activation message.

7. The method according to claim 3, further comprising the step of:

allocating, within the respective base transceiver stations, respective base transceiver station resources for the positioning of said mobile station after the expiration of said given time period.

8. The method according to claim 1, further comprises the step of:

adjusting, within said base station controller, a timer store for storing a value for said given time period, said timer store value being inserted into said resource allocation delay message.

9. The method according to claim 8, further comprising, after receipt of respective mobile positioning request acknowledgments from said respective base transceiver stations by said base station controller, the steps of:

comparing, a wait time corresponding to the amount of time from transmission of said mobile positioning request message to the receipt of all of said mobile positioning request acknowledgments with said given time period;

adjusting said given time period; and storing said adjusted given time period within said timer store.

10. The method according to claim 9, wherein said step of comparing comprises:

transmitting, from said base station controller to said serving base transceiver station, a handover access burst message if said wait time exceeds said given time period.

11. The method according to claim 9, wherein said step of adjusting comprises:

stopping said timer store within said base station controller; and calculating a difference between said wait time and said given time period pursuant to a subtraction operation function.

12. A telecommunications system for locating a mobile station, said system comprising:

a plurality of base transceiver stations, one of said base transceiver stations being a serving base transceiver station in communication with said mobile station;

a base station controller for controlling said plurality of base transceiver stations, said base station controller transmitting a mobile positioning request message to said plurality of base transceiver stations; and delay means, within the respective base transceiver stations, for delaying allocation of base transceiver station resources therein for a given time period pursuant to said mobile positioning request message.

13. The telecommunications system according to claim 12, further comprising:

a timer store, within said base station controller, for storing therein a value for said given time period, said base station controller inserting said timer store value into said mobile positioning request message.

14. The telecommunications system according to claim 12, further comprising:

respective timers within each of said plurality of base transceiver stations, said respective timers being started upon receipt of said mobile positioning request message and running for the duration of said given time period value.

* * * * *